United States Patent [19]
Loeffler et al.

[11] 4,443,290
[45] Apr. 17, 1984

[54] WORK STATION

[75] Inventors: Earl F. Loeffler, Uniontown; Stephen R. Barrickman, Tallmadge; John A. Johnsen, Wadsworth, all of Ohio

[73] Assignee: The Firestone Tire & Rubber Company, Akron, Ohio

[21] Appl. No.: 386,373

[22] Filed: Jun. 8, 1982

[51] Int. Cl.³ .............................................. B29H 17/00
[52] U.S. Cl. ................................ 156/396; 156/405.1; 156/414; 156/406; 156/111
[58] Field of Search .................... 156/111, 394.1, 396, 156/405.1, 409, 414–420, 406

[56] References Cited
U.S. PATENT DOCUMENTS

| | | | |
|---|---|---|---|
| 1,964,363 | 6/1934 | Ostling et al. | 156/396 |
| 2,319,643 | 5/1943 | Sternad et al. | 156/396 |
| 2,407,152 | 9/1946 | Haase | 156/396 |
| 3,388,024 | 6/1968 | Black et al. | 156/415 |

Primary Examiner—Lois E. Boland
Attorney, Agent, or Firm—Ronald Brietkrenz

[57] ABSTRACT

A tire assembly means employing a conveyor (12) which is used to transport a plurality of tire building drums (14) to a plurality of applicator stations (11) wherein various components are applied to the tire building drums (14) at the various applicator stations (11) in order to fabricate a tire when the tire building drums have made a complete traversal of the conveyor (12), wherein the tire building drums (14) are maintained in an angled relationship with respect to the conveyor (12) and the applicator stations (11).

14 Claims, 4 Drawing Figures

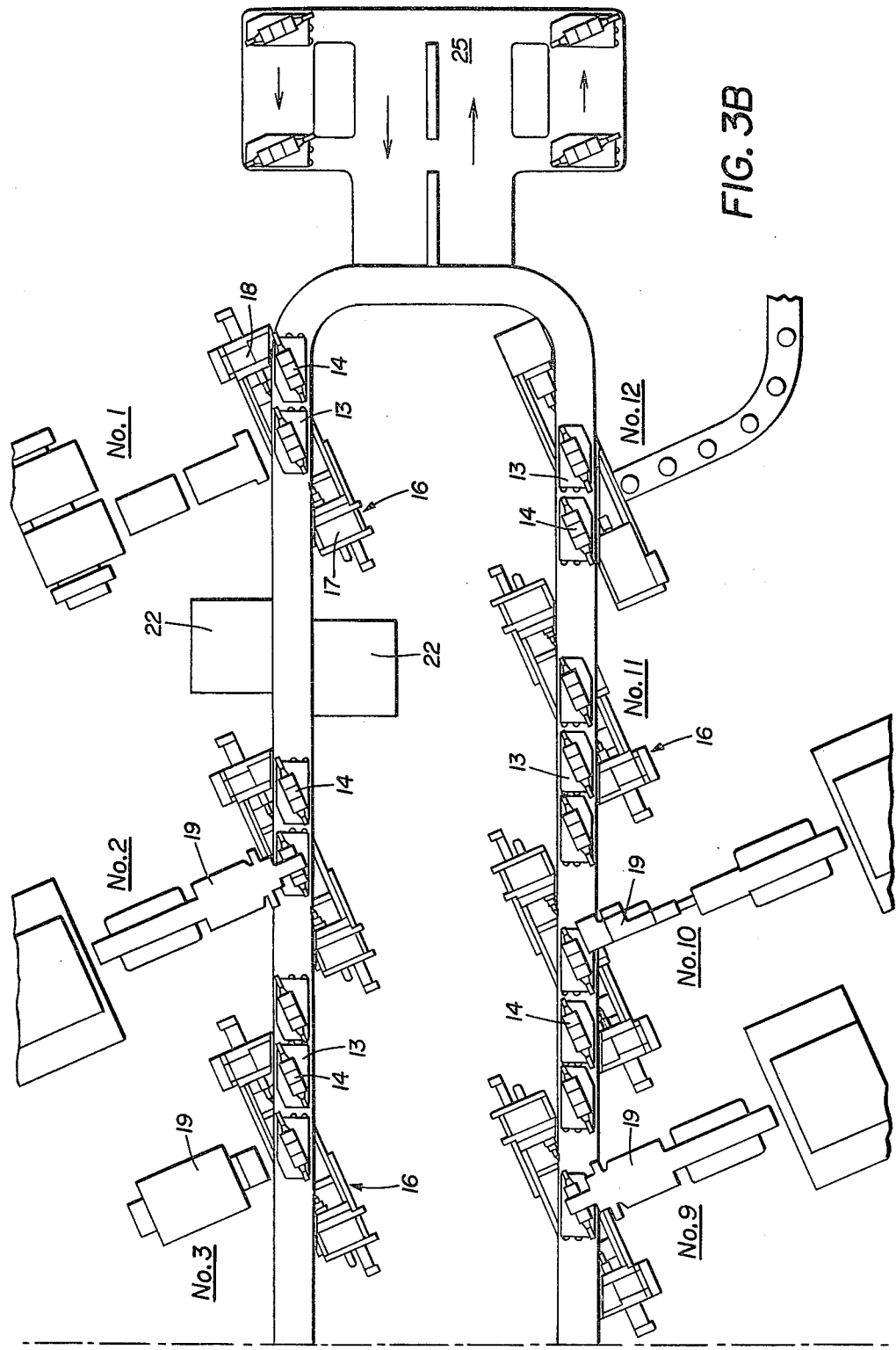

WORK STATION

BACKGROUND OF THE INVENTION

I. Field of the Invention

This invention relates to a manufacturing system and more particularly to a means for the manufacture of tires and similar articles. Specifically, the instant invention relates to a tire assembly means employing a plurality of tire building drums which are transferred to various work stations in order to apply components to the tire building drums and thus fabricate a tire. The tire building drums are maintained at an optimal angle with respect to the equipment employed to fabricate the tire and the means employed to transfer the tire building drums in order to facilitate access to the tire building drum by both the equipment employed to fabricate a tire and equipment operators.

II. Description of the Prior Art

The use of tire building drums in connection with a series of machines between which the drums are transported in order to fabricate a tire is old in the art as disclosed by U.S. Pat. No. 1,818,955 to Maas. Maas discloses a machine in which tire building cores are transported past a series of stations, each of which is equipped to perform a special operation upon the tires under construction in order to effect fabrication of a tire. U.S. Pat. No. 1,876,759 to Romine relates to material handling apparatus particularly adapted to be used in connection with assembly operations and discloses the use of a moving pallet in order to effect material movement. U.S. Pat. No. 1,964,363 to Ostling et al., relates to an apparatus for manufacturing tires employing an endless chain conveyor adapted to carry tire building drums and accessory mechanisms along a track and in continuous motion while operators apply material and perform certain manual operations thereon, in combination with mechanical means for supplying materials in sequence of operation and according to consumption requirements. U.S. Pat. No. 2,071,716 to Wikle relates to a conveyor method of building pneumatic tires in which a plurality of tire building units are disposed about a circular rotatable table and are adapted for complimentary intermittent association with supply devices opposed to the rotatable table. U.S. Pat. No. 2,253,781 to Haase et al., relates to a tire building apparatus employing a plurality of tire building machines arranged in a group, conveying means for supplying the operators at the machines with the proper material when required, and servicing means for supplying material to the conveyor and other servicing means for removing finished tires therefrom. U.S. Pat. No. 2,319,643 to Sternad et al., relates to a tire building machine employing a series of tire building drums which are intermittently conveyed in spaced relation, with their axes disposed across the line of travel, past a plurality of chucking stations, where, during the intervals between conveyor movements, the drums are automatically lifted from the conveyor and centered between driving cones and various operations comprising applying and rolling the various elements of the tire casing onto the drums are consecutively performed. U.S. Pat. No. 2,818,907 to Sapp relates to a tire building machine having a series of collapsible tire building drums which are carried by a conveyor through each of a series of successive building stations. At each station the drum then at that station is chucked and rotated, if necessary, and some portion of the tire building procedure is performed. Upon the completion of the particular building operation at each station the drum is unchucked and returned to the conveyor and then all of the drums are advanced to the next succeeding station. U.S. Pat. No. 3,281,304 to Black et al., relates to a tire building machine having means for continuously supplying fabric to tire building drums and means for driving the drums longitudinally and rotationally along a support to wind the fabric helically around the drums to form a ply for tire carcasses. U.S. Pat. No. 3,543,392 to Perry et al., relates to an automatic manufacturing system having a plurality of work stations to which a variety of work pieces are carried by a network of conveyors, in which means are provided to identify each work piece and means are provided to direct the work piece through a path variable in accordance with load conditions in the network having various work stations where selected operations are automatically performed on the work piece.

Although the prior art discloses means for automating the manufacture of tires by employing a substantially continuous conveying means to transport headstock units or tire building drums to a plurality of applicator stations in order to cause a tire to be manufactured as the building drums traverse the assembly line, it should be noted that this prior art typically uses moveable headstock units which have their axes of rotation parallel to the direction of movement of the conveying means or alternatively employ a plurality of tire building drums which are disposed perpendicular to the direction of travel of the conveying means.

The use of multiple headstock units as disclosed for instance by U.S. Pat. No. 1,964,363 to Ostling et al., substantially increases the cost of the assembly line by requiring an excessively high number of headstock drive units and further increases the cost of such a manufacturing line by increasing the length of the assembly line due to this orientation of the drive units.

Other tire manufacturing lines employing multiple tire building drums as exemplified by U.S. Pat. No. 1,818,955 to Maas typically employ a series of tire building drums disposed with their axes of rotation perpendicular to the direction of movement of the conveying means which transports the tire building drums to the various applicator stations. The main disadvantage with this sort of configuration concerns the location of the applicator equipment in order to allow the applicator equipment to operate on the tire building drums. In this configuration, the applicator equipment must be located either above or below the transfer means. This location of the equipment generally raises or lowers such equipment away from operator height and thus substantially reduces operator access to the tire building drums in order to effect manual operations or quality inspection operations in the tire building process. This arrangement also substantially reduces operator access to the applicator equipment for servicing.

There is, therefore, a need for a tire assembly means which may be economically produced and which further allows operator access to the tire building drums in order to facilitate construction and quality inspection of the tires.

The instant invention solves these problems by providing a continuous conveying means which is adapted to transport a plurality of tire building drums to a plurality of applicator stations which are adapted to apply to the tire building drums various components of a tire in order to effect the construction of a first stage tire when a tire building drum has completely traversed the conveying means. A positional relationship is maintained between the tire building drums, conveying means and applicator stations which provides a compact assembly line and affords operator access to the tire building drums and the applicator equipment.

SUMMARY OF THE INVENTION

The present invention relates to a means for the fabrication of tires and more particularly to an assembly means employing a conveyor which is used to transport a plurality of tire building drums to a plurality of applicator stations wherein various components are applied to the tire building drums at the various applicator stations in order to fabricate a first stage tire when the tire building drums have made a complete traversal of the conveyor, wherein the tire building drums are maintained in an angled relationship with respect to the conveyor means and the applicator stations.

BRIEF DESCRIPTION OF THE DRAWINGS

FIGS. 3A and 3B are a plan view of the instant invention.

DESCRIPTION OF AN EXEMPLARY EMBODIMENT

Figure 1:
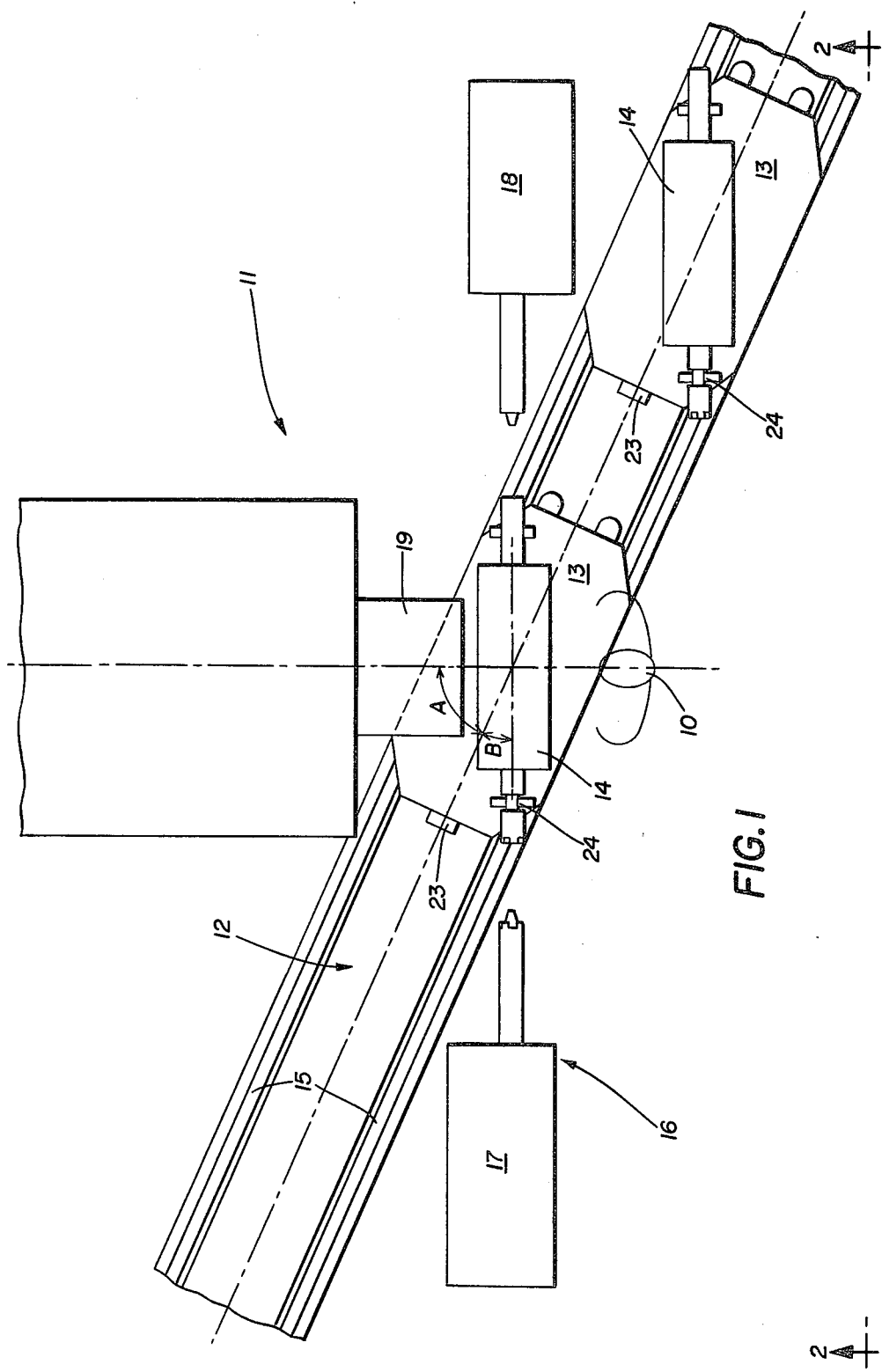
FIG. 1 is a plan view illustrating the relationship of the applicator means with respect to the conveying means and the tire building drums.
Figure 2:
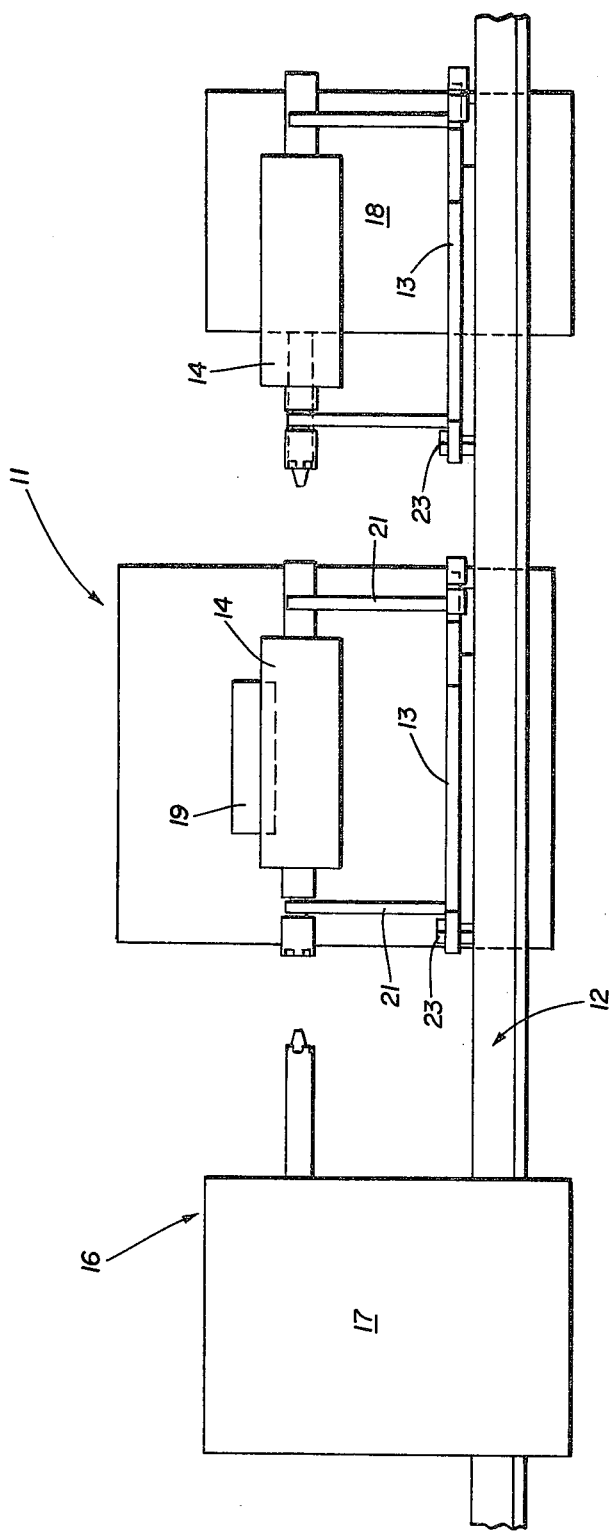
FIG. 2 is a front elevation of the apparatus shown in FIG. 1.

Referring now to FIG. 1 of the drawings, there is disclosed a simplified plan view of a typical applicator station employed in the instant invention. The applicator station 11 is comprised of conveying means 12 which is adapted to transport pallets 13 along the conveying means. Disposed on the pallets 13 are tire building drums 14. Straddling the conveying means 12 is drive unit 16 which is comprised of a tire building drum drive headstock 17 and a tire building drum support tailstock 18. Disposed proximate to the conveying means 12 is applicator 19 which may be adapted to apply various materials to the tire building drum 14.

Figure 3A:
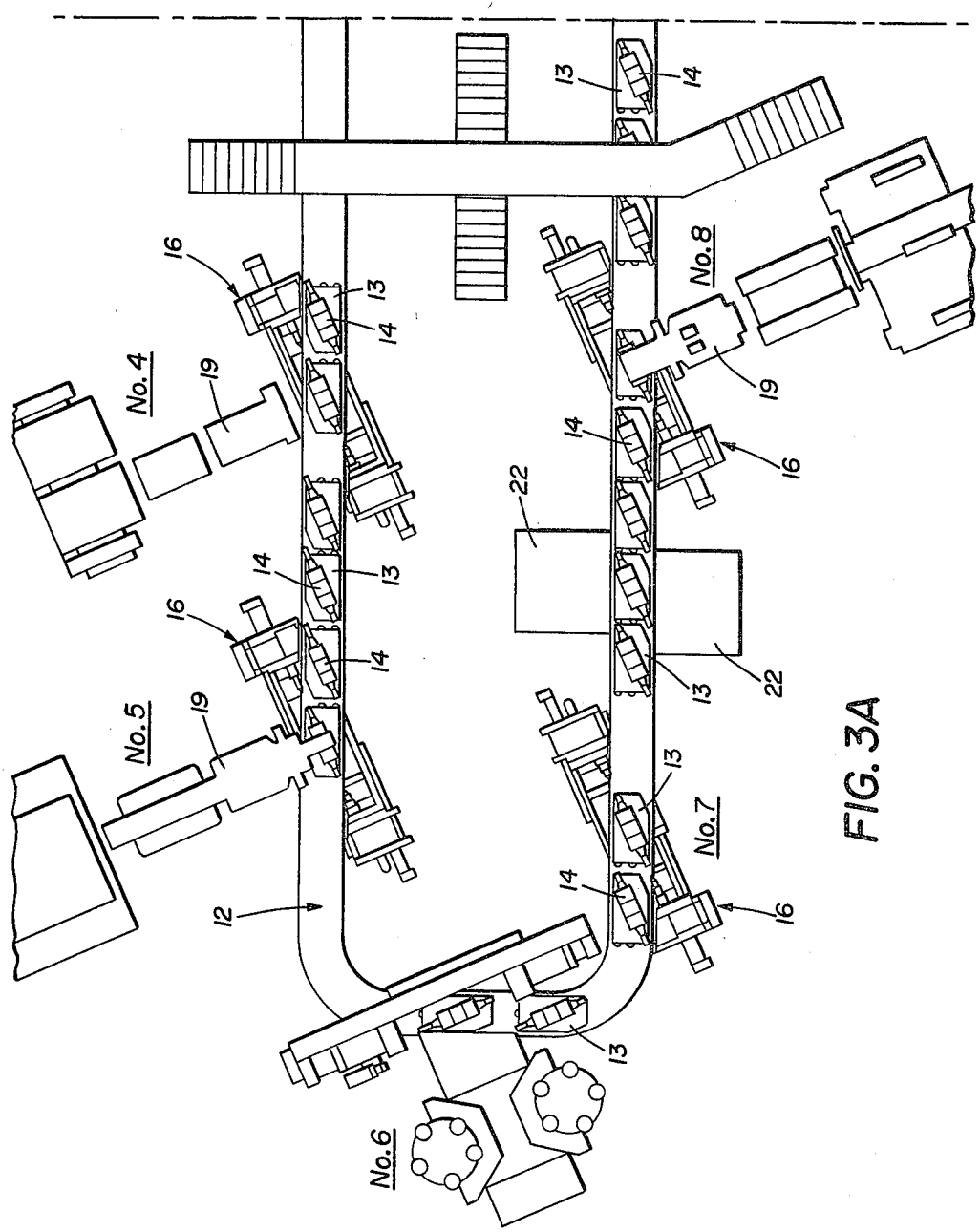

The conveying means 12 is, in the exemplary embodiment, a continuous loop dual chain-drive conveyor means manufactured by the Sys-T-Mation Division of the LaSalle Machine Tool Company of Davisburg, Mich. The double chain conveyor conveying means 12 is of a construction well known in the art employing two parallel spaced apart driven chain members 15 upon which articles may be transported in a non-synchronous manner. As shown in FIG. 3 of the drawings the conveying means 12 is formed in a continuous loop and is driven by conveyor drive means 22.

Disposed on the chain members 15 of the conveying means 12 are pallets 13. The pallets 13 frictionally engage the chain members 15 of the conveying means 12 in order to be transported by the conveying means 12. The pallets 13 employ supporting arms 21 to maintain the tire building drums 14 in a spaced relationship from the conveying means 12 and in a fixed positional relationship with respect to the pallet 13 by means of drum shaft extension groove 24 engaging one of the supporting arms 21.

The tire building drums 14 are of the expanding type with integral turn up bladders and shaft extensions similar to those disclosed in U.S. Pat. No. 3,687,756 to Appleby, et al., which are adapted to be supported between a headstock drive unit and a tailstock support unit and further adapted to be expanded or contracted radially by means of a drive mechanism which may be associated with the headstock-tailstock unit.

The applicator 19 is adapted to apply one or more of the components used in fabricating a tire on the tire building drum 14. The applicator may either automatically apply the component to the tire building drum or may be operator assisted in a manner similar to that disclosed in U.S. Pat. No. 1,964,363 to Ostling et al.

Referring now to FIG. 3 of the drawings, there is disclosed a plan view of the instant invention wherein a conveying means 12 is driven by conveyor drive means 22 and formed in an elongated continuous loop. Disposed on the conveying means 12 are a plurality of pallets 13 having thereon tire building drums 14. Disposed around the loop at spaced locations are a plurality of drive units 16 and their associated applicators 19.

In a typical operating sequence a pallet 13 having a tire building drum 14 is transported to applicator station No. 1 wherein the pallet 13 is caused to cease moving with the conveyor means 12 by pallet gate stop 23. The drive unit 16 is then energized in order to cause the tire building drum drive headstock 17 and the tire building drum support tailstock 18 to engage the ends of the tire building drum 14. Due to the conical nature of the ends of the tire building drum 14, the tire building drum 14 will be raised slightly when engaged by the headstock and tailstock, thus clearing the pallet 13 and disassociating the drum 14 from the conveyor means 12. The tire building drum drive headstock will then cause the tire building drum 14 to be rotated in order that the inner liner may be applied to the tire building drum by applicator 19. After the inner liner has been applied to the tire building drum 14, the rotation of the tire building drum is stopped and the tire building drum is released by the headstock and tailstock of the drive unit 16 and allowed to rest on the pallet 13. The pallet gate stop 23 is then released in order to allow the pallet 13 to be moved by the conveying means 12 to the next applicator at applicator unit No. 2.

A substantially identical sequence of steps are performed on the building drum 14 during the application of the abrasion gumstrip by applicator unit No. 2.

Similarly it may be seen that station No. 3 may be used as a back-up, manual let off and quality check; station no. 4 may be a body ply applicator; station no. 5 a belt edge insert applicator; station no. 6 a drum expand, bead set and turn up station; station no. 7 is turn up stitch; station no. 8 a sidewall base applicator; station no. 9 a white strip applicator; station no. 10 a veneer applicator; station no. 11 a sidewall stitch and quality check; and station no. 12 a tire removal station.

Drum repair and size change spur 25 provides a means of correcting faults as detected on the partially assembled tire or to make adjustments or repairs to the tire building drums 14. Faults are detected by automatic or manual means which cause a flag to be set on the pallet 13 which indicates to subsequent applicator stations that further work must not be done on that particular tire. The pallet 13 then moves through the system until arriving at the repair spur 25.

Thus, it can be seen that a first stage green tire may be fabricated utilizing the instant invention. One skilled in the art will readily appreciate that a second series of operations could be performed on the green tire by similar apparatus in order to complete the fabrication of the tire. It should be noted that the applicator units employed by the instant invention may be completely automatic in their operation or may employ conventional manual equipment.

Returning now in more detail to FIG. 1 of the drawings, it may be readily appreciated that the relationship of the applicator 19 with respect to the conveying means 12 and the drive unit 16 affords ready access to the tire building drum 14 by the operator 10. In particular, the above-noted configuration provides maximum exposure of the drum 14 to either applicators, operators or other equipment.

In the exemplary embodiment, the angle A between the direction of transfer of the conveying means 12 and the longitudinal axis of the applicator 19 is 65° and the angle B between the direction of transfer of the conveying means 12 and the axis of the drive unit 16 is 25°.

One of the problems associated with assembly line tire assembly operations is providing a suitable arrangement of the tire building drum, an operator, and the component applicator. A typical tire assembly machine arrangement is one where the drum is mounted either cantilever or between centers such that the operator is on one side, the applicator is at the rear, and the stitchers are at the bottom. If a system is conceived where drums are moved with their rotational axis at right angles to their direction of travel, then the headstock and tailstock can be easily accommodated, but the operator and server positions are occupied by the drum transport means. If the drums are moved in a direction such that their axis of rotation is parallel to the direction of travel, then the operator's position and server position are ideal, but there is no suitable solution for the headstock and tailstock.

An angular orientation of the conveying means with respect to the applicator and drive unit provides means for achieving both clearance for the drive unit, the operator and the applicator without significant compromise. Ideal angles are those closest to arriving at right angles to the transport axis. For example, in the system described above this angle is 65°. This optimal angle, however, will change with the length and diameter of the tire building drums. In a system employing a shorter tire building drum, the optimal angle would be smaller due to the shorter length of the tire building drum. Typical angles used would range from 50° to 70° with angles less than 50° causing problems associated with good station layout and angles larger than 70° requiring extremely long drum extension shafts.

The angular orientation of the axis of the drive unit 16 and the direction of transfer of the conveying means 12 (B) is preferably 25° but may range from 20° to 40°. Although the angles A and B are equal to 90° in the exemplary embodiment, it will be readily appreciated by one skilled in the art that A and B could be either greater than or less than 90°.

It will be apparent to those skilled in the art that various modifications and additions may be made in the instant invention without departing from the essential features thereof, which are intended to be defined and secured by the appended claims.

What is claimed is:

1. In an automated tire assembly apparatus having a plurality of tire building drums which are transported by a conveying means and which tire building drums are adapted to be engaged by a drive unit in order that tire components may be applied to said tire building drum by a component applicator, the improvement comprising:

an angular relationship between the axis of the tire building drum and the direction of movement of said conveying means of 20 to 40 degrees.

2. The improvement of claim 1 wherein said tire building drums maintain a constant angular relationship with respect to the direction of travel of said conveying means.

3. The improvement of claim 1 wherein said drive unit includes headstock drive means disposed on one side of said conveying means and a tailstock support means disposed on the opposite side of said conveying means.

4. An apparatus for applying components to a tire building drum comprising:
   (a) a drive unit having a drive headstock and a support tailstock adapted to grasp and rotate said tire building drum about a first axis between said headstock and said tailstock;
   (b) component applicator means disposed proximate to said tire building drum which tire building drum is supported between said headstock and said tailstock wherein the axis of application of said applicator means is perpendicular to said first axis;
   (c) tire building drum conveying means having its axis of travel between 20 and 40 degrees from said first axis.

5. An apparatus for constructing pneumatic tires comprising:
   (a) conveying means;
   (b) a plurality of pallet support means adapted to be transported by said conveying means;
   (c) a plurality of tire building drums adapted to be carried by said pallet support means; and
   (d) a plurality of applicator stations disposed at spaced intervals along said conveying means, wherein said applicator stations are disposed in an angular relationship with respect to said conveying means such that the axis of application of the applicator stations is disposed 50 to 70 degrees from the direction of transport of said conveying means and said axis of application is perpendicular to the axis of said tire building drums.

6. The apparatus of claim 5 wherein said applicator stations comprise a headstock unit disposed on one side of said conveying means and a tailstock unit disposed on the opposite side of said conveying means.

7. A tire building apparatus comprising:
   (a) conveying means;
   (b) tire building drum means adapted to be transported by said conveying means wherein the angle between the direction of travel of said conveying means and the longitudinal axis of said tire building drum means is between 20 and 40 degrees;
   (c) drive means adapted to rotate said tire building drum means; and
   (d) applicator means adapted to apply a tire component to said tire building drum means.

8. In an automated tire assembly apparatus having a plurality of tire building drums which are transported by a conveying means and which tire building drums are adapted to be engaged by a drive unit in order that tire components may be applied to said tire building drum by a component applicator, the improvement comprising:

an angular relationship between the axis of the component applicator and the direction of movement of said conveying means of 50 to 70 degrees and said axis of application is perpendicular to the axis of said tire building drums.

9. The improvement of claim 8 wherein said tire building drums maintain a constant angular relationship with respect to the direction of travel of said conveying means.

10. The improvement of claim 8 wherein said drive unit includes headstock drive means disposed on one side of said conveying means and a tailstock support means disposed on the opposite side of said conveying means.

11. An apparatus for applying components to a tire building drum comprising:
   (a) a drive unit having a drive headstock and a support tailstock adapted to grasp and rotate said tire building drum about a first axis between said headstock and said tailstock;
   (b) component applicator means disposed proximate to said tire building drum which tire building drum is supported between said headstock and said tailstock wherein the axis of application of said applicator means is perpendicular to said first axis;
   (c) tire building drum conveying means having its axis of travel between 50 and 70 degrees from said axis of application of said applicator means.

12. An apparatus for constructing pneumatic tires comprising:
   (a) conveying means;
   (b) a plurality of pallet support means adapted to be transported by said conveying means;
   (c) a plurality of tire building drums adapted to be carried by said pallet support means; and
   (d) a plurality of applicator stations disposed at spaced intervals along said conveying means, wherein said applicator stations are disposed in an angular relationship with respect to said conveying means such that the axis of said tire building drums is disposed 20 to 40 degrees from the direction of transport of said conveying means.

13. The apparatus of claim 12 wherein said applicator stations comprise a headstock unit disposed on one side of said conveying means and a tailstock unit disposed on the opposite side of said conveying means.

14. A tire building apparatus comprising:
   (a) conveying means;
   (b) tire building drum means adapted to be transported by said conveying means;
   (c) drive means adapted to rotate said tire building drum means; and
   (d) applicator means adapted to apply a tire component to said tire building drum means wherein the angle between the direction of travel of said conveying means and the longitudinal axis of applicator means is between 50 and 70 degrees and said axis of application is perpendicular to the axis of said tire building drum means.

* * * * *